Patented Oct. 17, 1950

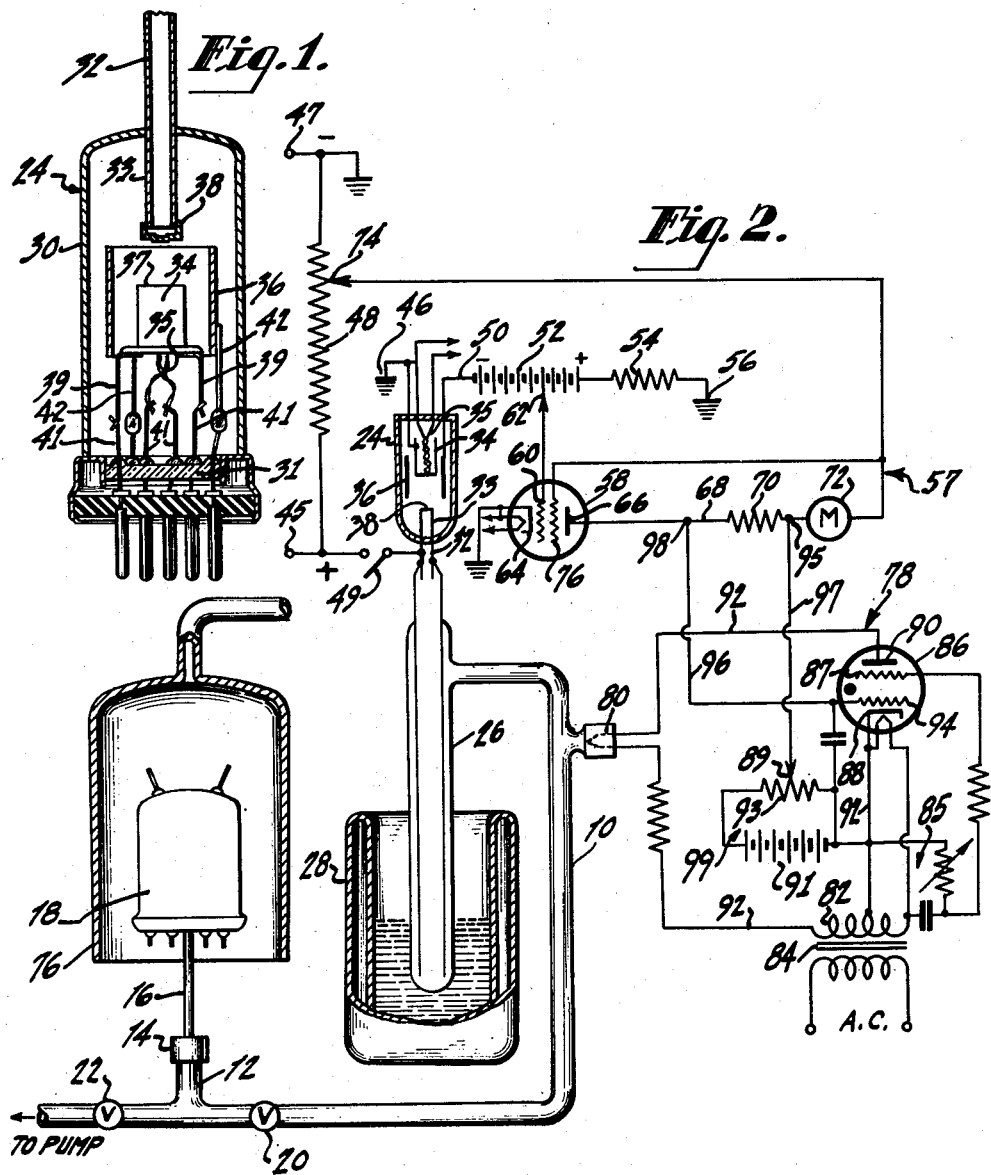

2,526,038

UNITED STATES PATENT OFFICE 2,526,038

LEAK DETECTOR FOR EVACUATED SYSTEMS

Herbert Nelson, Bloomfield, N. J., assignor to Radio Corporation of America, a corporation of Delaware Application March 7, 1947, Serial No. 732,972

12 Claims. (Cl. 175—183)

My invention relates to the detection and location of air leaks in evacuated systems and devices, and more particularly to an improved hydrogen ionization gauge incorporating an automatically operated sensitivity control.

In my co-pending application, Serial No. 575,447, filed January 31, 1945, now abandoned, I have disclosed an effective apparatus for detecting air leaks in exhaust systems and evacuated devices by means of an ionization gauge which comprises an evacuated envelope separated from the exhaust system or evacuated device by a thin palladium sheet. When heated by a filament the palladium sheet becomes permeable to hydrogen. The exhaust system or evacuated device to be tested is explored or probed with hydrogen. The presence of a leak will result in an increase in the partial pressure due to hydrogen within the exhaust system or the evacuated device regardless of the pressure of the other gases present. A flow of hydrogen will then take place through the hot palladium into the low pressure ionization gauge envelope. This increase of hydrogen within the gauge envelope causes a detectable change in the positive ion current flow through the tube indicating the leak in the exhaust system.

In normal operation of the leak detecting equipment described in my above cited co-pending application, lack of sensitivity of the palladium sheet occurs due to the adsorption of oxygen on the surface of the palladium sheet, which in turn prevents the passage of hydrogen into the envelope of the ionization gauge. Another condition producing low sensitivity of the palladium sheet resulted from the presence of oil vapors in the exhaust system in the region of the palladium sheet. The oil tends to dissociate when in contact with the hot palladium to produce hydrogen in quantities large enough to make the detection of small leaks impossible. Furthermore, though gauges of the type described in my above cited co-pending application have been found useful in practice, they have been found susceptible to damage during use. Thus, the accidental entrance of air into the exhaust system to which the gauge is attached at a time when the heater for the palladium is incandescent causes the evaporation of oxides onto the palladium and a consequent severe decrease in the hydrogen permeability of the palladium. A similar decrease in sensitivity of the gauge occurs with time during normal use of the device due to the accumulation on the palladium of material evaporated from the adjacent heater filament.

It is, therefore, an object of my invention to provide an improved device for the detection of air leaks in evacuated systems.

It is a further object of my invention to provide a leak detector whose sensitivity is automatically maintained during operation.

It is a further object of my invention to provide an ionization gauge whose sensitivity is not impaired by a simple and rugged construction.

It is also an object of my invention to provide an ionization gauge which is not susceptible to damage due to exposure and oxygen during operation.

It is also an object of my invention to provide an ionization gauge whose sensitivity is readily maintained in the presence of oil vapors.

The novel features which I believe to be characteristic of my invention are set forth with particularity in the appended claims, but the invention itself will best be understood by reference to the following description taken in connection with the accompanying drawing, in which:

Fig. 1 is a sectional view of a hydrogen ionization gauge tube, according to my invention; and Fig. 2 graphically discloses a hydrogen leak detector apparatus and related control circuits, according to my invention.

The ionization gauge tube 24 disclosed in Fig. 1 is an improved device over that disclosed in my co-pending application, cited above. The gauge 24 of Fig. 1 comprises preferably an exhausted metal envelope 30 closed at one end by a glass header 31. An anode electrode 33 comprises the enclosed end of a metal tube 32 sealed through the wall of the metal envelope 30. Sealed across the end of the enclosed anode portion 33 of tube 32 is a palladium cup 38. Mounted within the metal envelope 30 is a cathode cylinder 34 closed at 37. The top portion 37 of the cathode cylinder 34 is coated, preferably, with a mixture of the oxides of barium and strontium so as to provide a source of electron emission when the cathode cylinder is heated to the appropriate temperature. A cathode heater filament 35 is mounted within the cathode cylinder 34 to provide a source of energy to maintain the sensitizing cathode surface 37 at the electron emitting temperature during normal tube operation. The cathode cylinder 34 is mounted upon support rods 39 fixed to respective lead rods 41 sealed through the glass header 31. Likewise, filament 35 is supported by a pair of metal leads 41 sealed through the header 31. Coaxially enclosing the cathode cylinder 34 is a positive ion collector electrode 36. The electrode 36 is, preferably, of a tubular configuration and is mounted upon side rods 42 supported from the glass header 31, as indicated.

The envelope 30 of the ionization gauge 24 is evacuated in a well known manner and the residual gases are cleaned up by flashing of a getter material, not shown, as is well known in the art. The final pressure of gas within the tube envelope 30 is in the order of $10^{-7}$ millimeters of mercury. In operation, an appropriate potential drop is established between the anode electrode 33 and the cathode cylinder 34. When the activated surface 37 of the cathode is heated to a sufficiently high temperature an electron discharge will take place between the anode 33 and the cathode 34. The palladium metal cup 38 is positioned by the arrangement shown in Fig. 1 in a manner that the discharge between the anode 33 and the cathode 34 will maintain the temperature of the palladium metal 38 at around 800° C. The palladium cup at this temperature is permeable to hydrogen gas. If during tube operation there is any gas present within the tube envelope 30 the electron discharge established between the anode 33 and the cathode 34 will cause ionization of the gas to take place. The collector electrode 36 is maintained at a sufficiently negative potential as to attract the positive gas ions formed by the discharge. The positive gas ions formed within the tube will be swept out of the interelectrode space and collected by electrode 36. Electrode 36 is connected into an appropriate circuit, as will be described more fully below, for establishing a flow of current responsive to the amount of gas ionization within the tube. If the amount of gas within the ionization tube 30 is increased, obviously, a greater amount of gas ionization will take place and an increase in the gas ions present within the tube will result in an increased flow of current in the related circuit.

The ionization tube shown in Fig. 1 is an improvement over the corresponding ionization gauge disclosed in my above cited co-pending application. This improved structure of Fig. 1 is of a simplified construction. The metal envelope 30 may be of any desired design and I have found that a conventional metal envelope used for discharge tubes may be used. Furthermore, with this envelope 30, the arrangement and mounting of the cathode electrode 34 as well as the tubular collector electrode 36 may be done in a conventional manner from a glass header stem 31. The type of tubular anode electrode 33 shown in Fig. 1 and the arrangement of the palladium metal cup 38 eliminates the need of an additional heating filament to maintain the palladium metal 38 at the necessary temperature of around 800° C. This arrangement then not only eliminates the palladium heater but also the palladium heater circuits and the accompanying complications of sealing the circuit leads through the tube envelope. Furthermore, the type of tube design shown in Fig. 1 eliminates the complicated glass structure forming the plural chambers of the prior design disclosed in my above cited co-pending application.

As shown in Figure 2, ionization gauge 24 is connected to appropriate circuits for its operation. Anode tube 32 is connected directly to a positive terminal 45 of a direct current power supply while the cathode electrode 34 is connected as indicated to a ground terminal 46. The negative terminal 47 of the direct current power supply establishes the potential of ground by being connected thereto. This arrangement establishes a potential difference between the anode electrode 33 of the ionization tube 24 and its cathode electrode 34. This potential difference is preferably around 180 volts D. C. which is that maintained between terminals 47 and 45 of the direct current power supply. A voltage divider resistance 48 is connected between the power supply terminals 45 and 47. The collector electrode 36 of the ionization gauge 24 is connected by a conductor 50 in series with a battery 52 and a resistance 54 to ground at 56. The battery 52, as is indicated, has its positive terminal connected to the resistance 54. The voltage of battery 52 is, preferably, around 22½ volts so as to maintain the collector electrode 36 at a low negative potential relative to cathode electrode 34. During the operation of the ionization gauge 24, the discharge maintained between the cathode 34 and anode 32 will cause gas ionization to take place within the interelectrode space of the tube 24. Positive ions formed will be swept up by the negative electrode 36. This will result in a current flow in the circuit between terminal 56 and the collector electrode 36.

An arrangement is provided for amplifying the positive ion current flow established between terminal 56 and the collector electrode 36. This amplification may be provided by a D. C. amplifier circuit 57 comprising an amplifier tube 58 having a control grid 60 connected to a terminal point 62 of battery 52 in the positive ionization current circuit. The cathode 64 of amplifier tube 58 is maintained at ground potential while the anode electrode 66 is connected in a plate circuit by conductor 68 in series with a load resistance 70, milliammeter 72, to a terminal point 74 of the voltage divider 48. A screen grid 76 adjacent to the anode electrode 66 is maintained at a constant positive potential so that the plate current of tube 58 will be proportional to the voltage established on the control grid 60. The operation of the device is such that an increase in the current flow in the positive ionization circuit of collector 34 will cause a shift in the positive direction of the potential of terminal point 62 and of the control grid 60, resulting in a proportional increase in the plate current of the amplifier tube 58. This plate current change is indicated by the milliammeter 72. In like manner, a decrease in the positive ion current will cause a resulting decrease in the plate current.

In Fig. 2, there is disclosed an arrangement for detecting leaks in evacuated systems and devices. This apparatus comprises principally an exhaust manifold 10 connected through stopcocks 20 and 22 to an exhaust pump which is not shown. Between the stopcocks 20 and 22 is a branch line 12 by which the manifold 10 may be connected to any type of exhaust system, apparatus or device in which it is desirable to detect an existing leak. For example, as shown in Fig. 2, there is connected to the exhaust manifold 10 a discharge device 18. The discharge device 18 is connected in communication with the exhaust manifold branch 12 by its exhaust tubulation 16 through a rubber port 14. The exhaust manifold 10 is connected at its other end in communication with the ionization gauge 24 by the metal anode tube 32. Between the stopcock 20 and the anode communication tube 32 of the ionization gauge 24 there is provided a trap portion 26 immersed in preferably liquid air within a container 28. In the exhaust manifold 10 there is present at all times hydrocarbon vapors which come from the oils and greases used in the vacuum pump used and in the stopcocks 20 and 22. The purpose of the liquid air trap 26—28 is to prevent the diffusion of these hydrocarbon vapors as well as moisture from the manifold 10 into the region of the palladium barrier sheet 38. With the discharge device 18 in place, stopcocks 20 and 22 are opened and the exhaust manifold 10 is connected to any desirable exhaust means such as a rotary exhaust pump. The system is exhausted until the pressure of the gas within the device 18 as well as manifold 10 is reduced to a final pressure in the order of $10^{-4}$ millimeters of mercury.

To discover the location of a leak in the discharge device 18, a hood 76 containing hydrogen is placed over the discharge device 18 to completely immerse it in a hydrogen atmosphere. If any leak exists in the evacuated discharge device 18, hydrogen will enter the device and pass by the exhaust tubulation 16 into the exhaust manifold 10. The entering of hydrogen into the exhausted system from the discharge device 18 will cause a rise in the gas pressure within the manifold 10 and will result in the passage of hydrogen through the palladium sheet 38 into the ionization gauge 24 in order to equalize the hydrogen pressure on both sides of the palladium sheet 38. An increased quantity of gas in the discharge device 30 will result in an increase in the amount of gas ionization in the tube and a consequent larger flow of current in the circuit of collector electrode 34. As described above, this increased positive ion current flow can be detected by the milliammeter 72 of circuit 57.

The detection of the presence of a leak in a discharge device 18 may be performed with both of the stop cocks 20 and 22 open and while the exhaust pump is running to maintain a low pressure within the device 18 and manifold 10. Thus, if the leak is large, an excess of the hydrogen gas flowing through the leak into the device 18 will be removed from the manifold 10 and the remainder will be sufficient to be detected by the gauge 24 and milliammeter 72. In the case of a large leak in the device 18 and if the stop cock 22 were closed, an excess amount of hydrogen within the manifold system 10 would adversely affect the operation of the ionization gauge 24. However, if the leak in the device 18 is sufficiently small so that it cannot be detected with the manifold 10 connected to the pump, then the stop cock 22 to the pump is closed and the hydrogen hood 76 is maintained about the device 18 until sufficient hydrogen has leaked into the manifold 10 to cause an increase in the gas ionization within the tube 24 so as to be detected by the milliammeter 72.

The detection of the presence of a leak in the discharge device 18 as described above may be followed by removing the hydrogen hood 76 and probing for the leak by a sharp hydrogen jet in the suspected areas of the discharge device 18. When the specific locality of the leak is found by the sharp hydrogen jet, its presence will also result in a change in the positive ion current as indicated by the milliammeter 72.

In the operation of an ionization gauge, using a palladium barrier, it has been found in practice that the sensitivity of the palladium decreases due to several different conditions. In the exhaust manifold system, the hydrocarbon vapors derived from the oils and greases used in the vacuum pump and in the stopcocks used in the exhaust manifold will diffuse during a period of disuse into the region of the palladium sheet and onto the surface of the palladium. When, under these conditions, the ionization gauge is put into operation, the heated palladium plate will decompose the hydrocarbon vapors to form a large amount of hydrogen. The presence of this large amount of hydrogen will tend to mask any small increase of the manifold pressure due to the entrance of hydrogen through a leak in the exhaust device being tested. Furthermore, the presence of air at different times within the the exhaust manifold will cause the formation of oxides upon the exposed surface of the hot palladium sheet. These oxides decrease the sensitivity of the palladium by preventing the passage of hydrogen therethrough.

With my new type of ionization gauge described above relative to Figures 1 and 2, I am able to eliminate the above mentioned conditions which are so detrimental to the sensitivity of the ionization gauge. Oil vapors, which may have condensed in tube 32 and on the palladium sheet 38 as the result of the absence of a cooling agent around the trap 36 during a period of inactivity, may be burned out. This is done by opening manifold to the atmosphere and by operating tube 24 in the normal manner to produce a heating of the palladium sheet 38 and the neighboring regions of tube 32. About two minutes are allowed for the burning or oxidation of the hydrocarbons in the region of the palladium. The manifold may then be re-evacuated in preparation for its normal use as described above. What hydrogen gas which was evolved from the decomposition of the hydrocarbon vapors in contact with the hot palladium sheet 38 and which passed at that time into the ionization gauge 24, is largely pumped back through the palladium sheet 38 until there remains within the ionization gauge envelope 30 a pressure of hydrogen in the order of $10^{-7}$. This will equal the partial pressure of hydrogen remaining in the manifold 10 after exhaust. When the exhaust manifold 10 has been exhausted as far as possible by the pump, the stopcock 22 is closed and the detector is ready for use.

To both remove oxides previously formed on the palladium and also to maintain a condition such that oxides are not subsequently formed on the palladium during operation of the device due to the presence of oxygen in the manifold 10, I have found it expedient to maintain a small amount of hydrogen within the system in the order of $1 \times 10^{-7}$ millimeters of mercury. This hydrogen must be continuously replaced since due to getter action within the gauge 24 and the absorption of hydrogen on the surface of the walls of the apparatus, hydrogen that is present is continuously being cleaned up. To provide this constant though small supply of hydrogen within the exhaust system, I provide a filament 80 mounted within the exhaust manifold 10. Filament 80 is preferably of nichrome wire which will not burn out in the presence of air. It is maintained at a temperature sufficiently high to decompose the hydrocarbon vapors which are always present within the exhaust manifold 10 and thus provide a ready source of hydrogen.

Since the manifold 10 is exhausted during operation to a pressure in the order of $10^{-4}$ millimeters, there is always present some gas within the manifold 10. Part of this gas is hydrogen supplied from the decomposition of the hydrocarbon vapors by the heated filament 80. This hydrogen will represent a partial pressure of all the gases within the exhaust system and, as mentioned above, is preferably maintained in the order of about $1 \times 10^{-7}$. This partial pressure of hydrogen within the exhaust manifold 10 will distribute itself throughout the system and pass through the heated palladium sheet 38 until the pressure of the hydrogen within envelope 30 is equal to that within the manifold 10. The presence of hydrogen within the envelope 30 due to this partial hydrogen pressure within the exhaust system causes ionization to take place and a resultant current flow in the positive ion circuit of electrode 34. Since this partial pressure of hydrogen is constantly reduced as mentioned above by the getter action within the ionization tube 24 as well as by its absorption on the walls of the system, there will be a gradual decrease in the ionization current detectable by the milliammeter 62. This necessitates a control for filament 80 so that the rate of hydrogen generation can be constantly maintained equal to the rate of absorption of the hydrogen by the system.

Filament 80 comprises a portion of a circuit 78 which provides a current flow for heating the filament 80. A voltage potential is provided in circuit 78 by the secondary 82 of a transformer 84. This voltage may be of any desired amount having the proper relationship to the resistance of the circuit and the filament 80. In one arrangement, the preferred voltage provided by the secondary 82 was 120 volts. To control the current flow through the filament 80 there is provided in the circuit 78 a gas control tube 86 having an indirectly heated cathode 88 and an anode 90 connected by a conductor 92 to the transformer secondary 82 and the filament 80. The transformer secondary coil 82 establishes a potential difference between the anode 90 and the cathode 88 of the control tube 86. Under proper conditions there is a discharge through tube 86 which provides a flow of current through the circuit 78 for heating filament 80.

As described above, it is desirable that the generation of hydrogen by filament 80 be controlled so that the hydrogen generation will approximately be equal to the hydrogen absorption by the gettering action of the exhaust system. To automatically control the generation of hydrogen by filament 80 so as to maintain the partial pressure of hydrogen in the exhaust manifold 10 at a constant value, the filament circuit 78 is coupled to the amplifier circuit 57. The control electrode 94 of the control tube 86 is connected by a conductor 96 to a terminal 98 of the conductor 68 of circuit 57. Furthermore, the cathode 88 of the control tube 86 is connected by a potentiometer unit 99 and conductor 97 to terminal 95 of the circuit 57. Between the terminal points 98 and 95 of circuit 57 is the load resistance 70 which is preferably of 10,000 ohms. A current flow in the output circuit of the amplifier tube 58 will establish the terminal point 98 at a more negative potential than the terminal point 95 which will result in the control electrode 94 of the control tube 86 being at a more negative potential than the cathode electrode 88. The potentiometer unit 99 is essentially a voltage divider in which a resistance 93 is connected across a battery 91. By adjusting the movable contact 89 of connector 97, the potential bias of cathode electrode 88 of control tube 86 may be set to any desired bias relative to the potential of the control electrode 94. A screen grid 87 is connected to a phase shift network 85 which operates in a well known manner to permit the control tube 87 to conduct a current proportional to the changes in potential on control grid 76. From this described arrangement a change in the potential of control grid 94 will cause a proportional change in the current conduction through tube 86 and filament circuit 78. The relationship of control grid 94 to the output circuit of the amplifier tube 58 is such that an increase in current flow through the amplifier output circuit will cause the potential of the control electrode 94 to be more negative relative to the cathode electrode 88 of control tube 86. The impression of a more negative voltage upon the control grid 94 will reduce the average current flow through the control tube 86. In a like manner, a decrease in the plate current of circuit 57 will result in a more positive bias being placed on control electrode 94 relative to the cathode potential of electrode 88 resulting in an increase in the average current flow through tube 86 and filament circuit 78.

The operation of circuit 78 relative to circuit 57 is such that for a certain amount of gas ionization taking place in the ionization gauge 24 there will be a definite amount of current flow through filament 80. It follows then that control circuit 78 operates to maintain a current flow through filament 80 of an amount inversely proportional to the hydrogen gas within exhaust manifold 10. If for any reason the absorption of hydrogen within the system is increased to a greater amount than the generation of hydrogen by filament 80, there will be a resulting drop of the partial pressure within the exhaust manifold 10. This will result, as described above, in a decrease of the amplified ionization current through circuit 57, which will result in a corresponding increase in current flow through circuit 78 and consequently a greater generation of hydrogen by filament 80 to restore the hydrogen pressure in manifold 10. In a similar manner, if for any reason there is an increase of the partial pressure of hydrogen within the exhaust manifold 10 there will result an increased ionization current in the circuit 57 and a resulting decrease of heater filament current in circuit 78. This then reduces the rate of hydrogen generation by filament 80 so that the partial pressure of hydrogen within the exhaust manifold 10 is restored to its former pressure.

By the particular automatic filament current control circuit 78, it is thus possible to maintain the partial pressure of hydrogen within the exhaust manifold 10 at a desired constant value, preferably at a pressure in the order of $1 \times 10^{-7}$ millimeters of mercury. The constant presence of this small amount of hydrogen within the exhaust system 10 provides a means for keeping the palladium sheet 38 free from the formation of oxides thereon. Elimination of oxides due to the oxidation of the palladium in the presence of air provides a much greater sensitivity of the palladium sheet 38 so that at all times the permeability of the palladium is not impaired. Also, in this manner, hydrogen entering the exhaust system 10 from a leak in the discharge device 18 is rapidly detected by an increase in the amplified ionization current of circuit 57.

From the above discussion it can be seen that the type of ionization gauge disclosed at 24 provides an improved device over the prior system described in my co-pending application cited above. The arrangement disclosed in Fig. 1 is not harmed by the presence of air or oxygen within the exhaust manifold 10. As described above, if any oxidation of the palladium disc 38 takes place it may be easily removed, by the generation of hydrogen within the system from the filament 80. Furthermore, the presence of hydrocarbon vapors on or near the sensitive barrier 38 may be quickly eliminated by introducing air into the system and burning off the hydrocarbons.

The ionization gauge 24 is also an improved design over the prior modification in the above cited co-pending application. This improved design eliminates a separate filament heating element for the palladium window and, furthermore, provides a single envelope 30 for the ionization gauge. Furthermore, the elimination of the separate heater element removes the danger of the presence of air in the exhaust system during the operation of the ionization gauge. In the former design, disclosed in the above copending application, the heater filament for the palladium barrier gave considerable trouble when suddenly exposed to the atmosphere in its heated state due to any accidental breakage of the system or inadvertent filling of the exhaust system 10 by air. The palladium heater filament would oxidize and deposit the oxides on the adjacent palladium barrier with a resulting loss of sensitivity for the palladium. Furthermore, there was the danger that in the presence of air the heated palladium filament would burn out with a consequent destruction of the ionization gauge. However, the above described system, disclosed in Figs. 1 and 2, provides a simple construction in which the ionization gauge 24 is made of conventional tube structures without any complicated glass working. Also, the palladium window is arranged in such a way that its sensitivity may be quickly reestablished if it becomes impaired by oxidation or by the presence of the hydrocarbons within manifold 10.

The leak detector disclosed in Figs. 1 and 2 was designed for use in laboratory and factory for checking air leaks in equipment or devices employing evacuated enclosures. I have run tests on transmitting tubes having envelopes including metal-to-metal and metal-to-glass seals. This leak detecting device has proven invaluable in checking graded-metal seals and other types used in both large receiving and miniature electron tubes. The sensitivity of the device is such that leaks in the order of $1 \times 10^{-4}$ liter microns per sec. of hydrogen, which formerly were impossible or difficult to locate because of their small size, can now be accurately located in a few minutes. The leak detector may also be used to check any glass or metal vacuum systems such as employed in processing equipment, or, for example, vacuum stills, vacuum furnaces, cathode ray tubes, vacuum spectographs, etc.

While certain specific embodiments have been illustrated and described, it will be understood that various changes and modifications may be made therein without departing from the spirit and scope of the invention.

What I claim as new is:

1. A device for detecting leaks in an evacuated system, said device comprising an exhaust manifold adapted to be maintained at a low gas pressure and to be connected in communication with said evacuated system, an evacuated envelope, a tubular member connecting said manifold in communication with said envelope, one end of said tubular member enclosed within said envelope to form an anode electrode, a cathode electrode spaced within said envelope from said tubular anode electrode to maintain a gas ionizing electron discharge therebetween, a palladium sheet sealed across to close said one end of said tubular anode electrode, said palladium sheet positioned in the path of said discharge to be heated thereby, whereby said sheet will become permeable to hydrogen, means including a negatively charged collector electrode within said envelope for establishing a current flow responsive to positive hydrogen ions within said envelope, and means responsive to said positive hydrogen ion current to maintain a quantity of hydrogen gas within said manifold, said responsive means including a heated filament within said manifold to break down hydrocarbon vapors therein.

2. A device for detecting leaks in an evacuated system, said device comprising an exhaust manifold adapted to be maintained at a low pressure and to be connected in communication with said evacuated system, an evacuated envelope joined to said manifold, a metal sheet permeable to hydrogen when heated, said metal sheet positioned to separate the interior of said manifold from the interior of said envelope, means including spaced electrodes within said envelope for establishing a hydrogen gas ionizing discharge therebetween, a first circuit including a negatively charged collector electrode within said envelope for providing a current responsive to positive gas ions within said envelope, a filament within said manifold to maintain a quantity of hydrogen gas therein, a second circuit including said filament for providing a filament heating current therefor and means responsive to said positive ion current to vary the amount of said filament current in an inverse proportion to said positive ion current.

3. A device for detecting leaks in an evacuated system, said device comprising an exhaust manifold adapted to be maintained at a low gas pressure and to be connected in communication with said evacuated system, the low gas pressure within said manifold including a partial pressure due to the presence of hydrocarbon vapors, an evacuated envelope, means joining said envelope in communication with said manifold, a palladium barrier closing said communication between said envelope and said manifold, an anode and cathode electrode spaced within said envelope to provide a gas ionizing electron discharge therebetween, said palladium barrier positioned to be heated by said electron discharge whereby said barrier will become permeable to hydrogen, a first circuit including a negatively charged collector electrode within said envelope to establish a current flow responsive to positive ions within said envelope, a filament within said manifold to break down said hydrocarbon vapors and maintain a partial pressure of hydrogen within said manifold, a second circuit including said filament to provide a filament heating current therefor, and means operatively connected between said first and second circuits to vary the amount of said filament current in an inverse proportion to said positive ion current.

4. A leak detector comprising an evacuated envelope, an exhaust manifold adapted to be maintained at a low gas pressure, a tubular member connecting said manifold in communication with said envelope, one end of said tubular member enclosed within said envelope to form an anode electrode, a cathode electrode spaced within said envelope from said anode electrode to maintain a hydrogen gas ionizing electron discharge therebetween, a metal sheet permeable to hydrogen when heated seal across said enclosed end of said tubular member and in the path of said discharge, means including a negatively charged collector electrode within said envelope for establishing a current flow responsive to positive hydrogen ions within said envelope, and means responsive to said positive hydrogen ion current flow to maintain a quantity of hydrogen gas within said manifold.

5. An ionization gauge for detecting a leak in an evacuated system, said gauge comprising an evacuated envelope, an anode and a cathode electrode spaced within said envelope to support an electron discharge therebetween, a collector electrode mounted within said envelope adjacent to the path of the electron discharge, said anode electrode including a tube extending into the envelope, a palladium closure member sealed across to close the end of said tube within said envelope and arranged to be heated by said electron discharge whereby said closure member will become permeable to hydrogen, the other end of said tube extending through said envelope to expose one face of said member to the exterior of said envelope, said other end of said tube adapted to be sealed in communication with said evacuated system.

6. An ionization gauge comprising an evacuated envelope, a cathode and a collector electrode spaced within said envelope, an anode electrode including a tubular member sealed through said envelope with one end enclosed within said envelope and spaced from said cathode to support an electron discharge therebetween, a sheet of metal permeable to hydrogen when heated sealed across to close the end of said tubular member within said envelope, said metal sheet arranged to be heated by the discharge between said anode and cathode electrodes.

7. An ionization gauge comprising an evacuated envelope, an anode, a cathode and a collector electrode enclosed in spaced relationship within said envelope, a portion of said anode within said envelope including a metal sheet permeable to hydrogen when heated, said metal sheet exposed to the exterior of said envelope and arranged to be heated by the discharge between said anode and cathode electrodes.

8. An ionization gauge comprising an evacuated envelope, a plurality of electrodes including an anode a cathode and a collector electrode enclosed within said envelope, said anode including a metal sheet permeable to hydrogen when heated, one face of said metal sheet exposed to the exterior of the envelope.

9. A leak detector for a vacuum system including a conduit adapted to be connected to a chamber to be evacuated, an ionization gauge coupled to said conduit to be responsive to the conditions of vacuum in said conduit, a hydrogen permeable barrier between said conduit and said ionization gauge, means for generating a hydrogen gas within said conduit and means coupled between said ionization gauge and said hydrogen generating means and responsive to the condition of vacuum in said conduit for controlling the generation of said hydrogen gas.

10. A leak detector for a vacuum system comprising an exhaust manifold adapted to be connected to an exhaust pump, an ionization gauge coupled in communication with said manifold, a hydrogen permeable barrier separating said ionization gauge and said manifold, said gauge including means responsive to the presence of hydrogen within said manifold, means for generating hydrogen gas within said manifold, and means responsive to the change in pressure of the hydrogen within said manifold for controlling the hydrogen generating means.

11. A leak detector for a vacuum system comprising an exhaust conduit adapted to be connected to a vacuum pump, an evacuated ionization tube including an anode and a cathode electrode to provide a gas ionizing discharge therebetween, said anode electrode including a hollow element forming a communication with said exhaust conduit and an anode portion closing said communication, said anode portion being permeable to hydrogen at a predetermined temperature, means within said tube for maintaining said anode portion at said predetermined temperature to permit the entry of hydrogen from said conduit into said ionization gauge, means connected to said tube for indicating the amount of positive gas ions within said tube, means for supplying hydrogen to said conduit including a filament, an electrical circuit therefor and a tube within said circuit to control the current through said filament, connections between said control tube and said positive ion indicating means for operating said control tube in response to the concentration of hydrogen within said conduit.

12. A leak detector for a vacuum system including a conduit adapted to be connected to a vacuum pump, an ionization gauge having a hollow anode communicating with said conduit and being permeable to hydrogen under predetermined temperature conditions, and means within said tube for determining the temperature of said anode, an indicating system connected to said tube, a hydrogen generating means communicating with said conduit and including a filament for generating a hydrogen atmosphere, a heating system for said filament including a control tube and connections between said control tube and said indicating system for controlling the generation of hydrogen in said conduit, said indicating system including an amplifier tube having an output anode, and an indicating device, electrical connections between said amplifier tube and said indicating device including a load resistance, said control tube including a cathode, anode and control grid, a connection from said control grid to one side of said load resistance, and an electrical connection from said cathode to said other side of said load resistance for determining the bias on said control grid to determine operation of said control tube.

HERBERT NELSON.

REFERENCES CITED

The following references are of record in the file of this patent:

UNITED STATES PATENTS

| Number | Name | Date |
| --- | --- | --- |
| 1,372,798 | Buckley | Mar. 9, 1921 |
| 1,566,279 | King | Dec. 22, 1925 |
| 1,579,117 | Kingdon | Mar. 30, 1926 |
| 1,725,281 | Kingdon | Aug. 20, 1929 |
| 1,941,157 | Smith | Dec. 26, 1933 |
| 1,970,532 | Bouwers | Aug. 14, 1934 |
| 2,082,638 | Kingdon | June 1, 1937 |
| 2,400,940 | McCollum | May 28, 1946 |